June 2, 1970     T. M. GRIFFITHS     3,514,930

MOWERS

Filed March 27, 1967

INVENTOR
THOMAS McINTYRE GRIFFITHS
By Shoemaker and Mattare
ATTYS.

United States Patent Office 3,514,930
Patented June 2, 1970

3,514,930
MOWERS
Thomas M. Griffiths, General Beyers St. Extension, Bloemfontein, Orange Free State, Republic of South Africa
Filed Mar. 27, 1967, Ser. No. 626,332
Claims priority, application Republic of South Africa, Apr. 7, 1966, Ser. No. 66/2,049
Int. Cl. A01d 35/26
U.S. Cl. 56—25.4        5 Claims

ABSTRACT OF THE DISCLOSURE

This invention concerns lawn mowers of the type wherein air pressure generated by a blower is used to lift the mower off the ground to enable cutting to be effected by a rotating blade and is more particularly concerned with the utilization of heat generated by the engine to increase the effectiveness of the air compressed by the blower as a lifting medium. The invention thus involves the utilization of heat energy normally wasted in machines of this type to increase the efficiency of operation of the mower.

---

This invention relates to mowers and more particularly to mowers used for the cutting of lawns in homes or parks.

Mowers have been made which are held above the lawn being cut by a cushion of air generated by a blower suitably mounted in the machine directly above a rotary cutting blade.

It is the object of the present invention to provide a mower of the above type which will operate more efficiently than those at present in use and further by the utilisation of energy which is normally wasted.

According to this invention there is provided a lawn mower comprising a motor connected to drive a rotatable cutting blade, a blower mounted in a body to discharge in a manner providing lift to the mower and means for heating the air compressed by the blower prior to discharge thereof.

Further features of this invention provide for the blade and blower to be mounted on a substantially vertical power shaft projecting on either side of an internal combustion engine and for blower, engine and blade to be housed in a single body construction.

According to a still further feature of the invention there is provided an air intake for an internal combustion engine in a part of the mower body subjected to high pressure created by said blower.

Two examples of this invention, which are not to be considered as limitative to the scope thereof, are described below with reference to the accompanying drawings in which.

Like parts have been given similar reference numerals where applicable.

In both these preferred embodiments the mower has a body which is constructed of strong lightweight plastics material, that is to say fibre-reinforced synthetic resin for example. Metal pressings or suitable strong plastics materials with or without reinforcement may be used for these parts, and especially as regards the use of metal or metal-reinforced synthetic resin material for the blade housing as described below.

Figure 1:
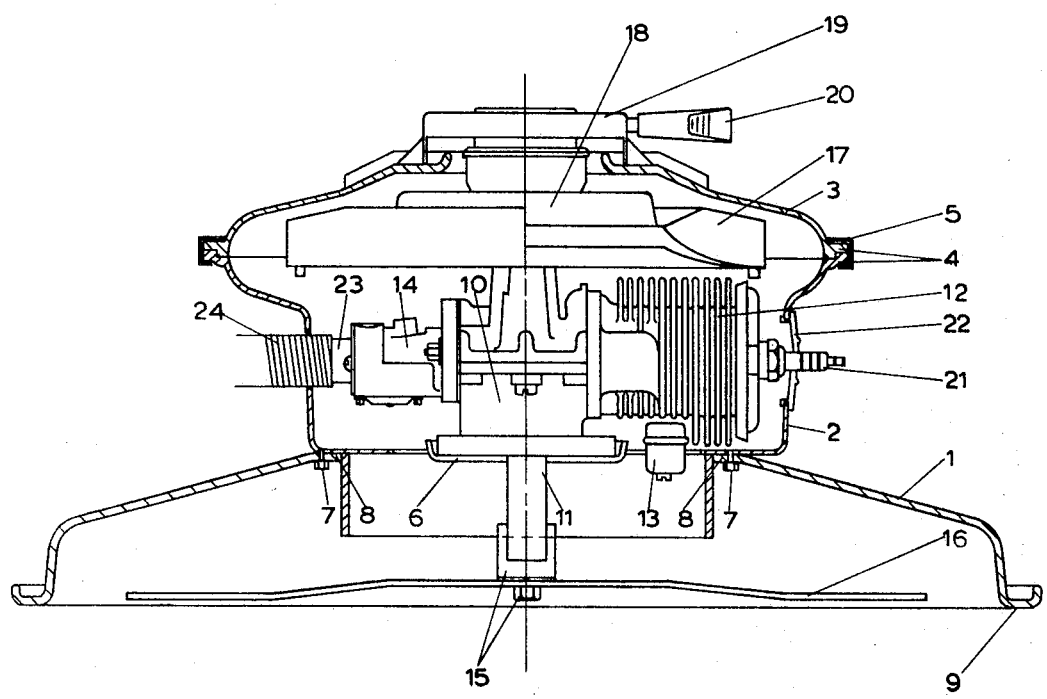
FIG. 1 shows a part sectional elevation of a lawn mower.
Figure 2:
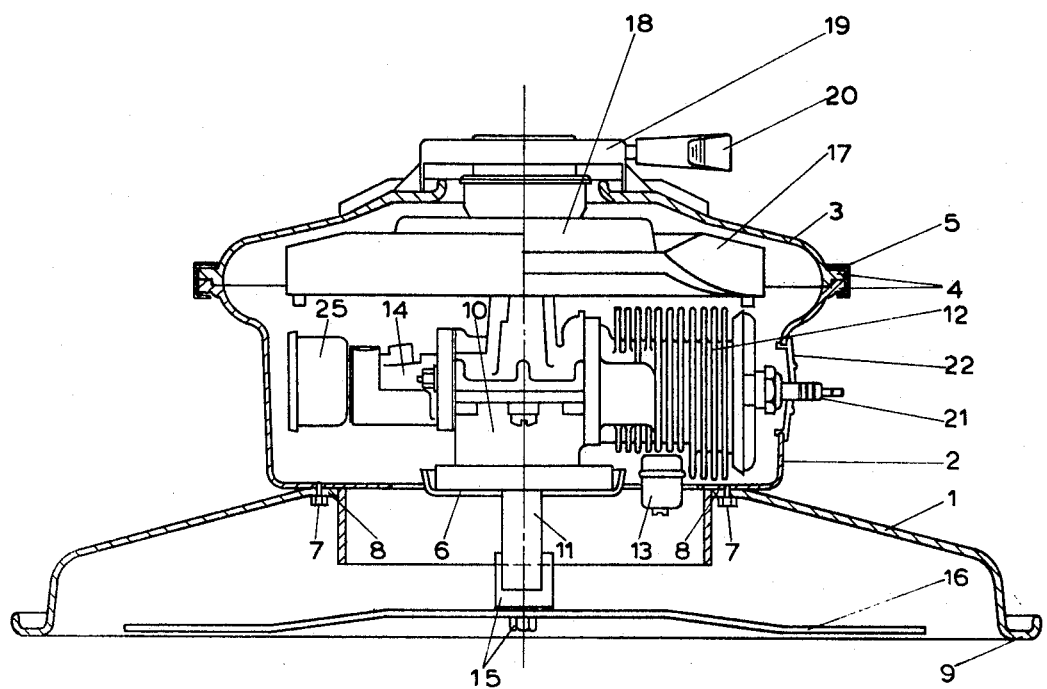
FIG. 2 shows a part sectional elevation of a lawn mower similar to that of FIG. 1, but slightly modified.

Referring, now, to FIGS. 1 and 2, the mower body consists of an inverted dish-shape blade housing 1, an engine housing part 2 and a top housing 3. The top housing 3 and engine housing part 2 both have annular abutting flanges 4 which are secured in juxtaposition by a channel-shaped resilient band 5.

The base of the engine housing part 2 is pierced for the reception of fasteners 7 for the top flange 8 of the blade housing 1 and is formed as a spider 6 to form the engine mounting. The base of the blade housing 1 is provided with a flattened rim portion 9 to provide a greater contact area with the ground.

In this example an internal combustion engine, preferably a petrol engine of known design of approximately 4 horsepower rating, is provided in the body, secured on the inturned flange or a spider 6 attached to or integral therewith.

The engine consists of a crankcase 10 with a vertical power shaft 11 directly from the crankshaft, a finned cylinder block assembly 12, an exhaust stack 13 and a carburetor 14. The shaft 11 protrudes on both sides of the crankcase 10 and at its lower end carries securing and seating means 15 for a cutting blade 16.

The upper part of the shaft 11 carries a blower fan 17 which is also the sole cooling means for the engine, and an ignition magneto 18. A recoil starter 19 having a pull-handle 20 is mounted on part 3 of the casing. The magneto is coupled, by cable means not shown, to a spark plug 21 which protrudes from the cylinder block assembly 12 and through an aperture in the engine housing part 2. The aperture is sealed around the plug 21 with a flexible moulding 22 which is readily removable to provide easy access to the spark plug for maintenance.

In this example, all the parts described above are common to both embodiments. It will of course be understood that air may enter the body of the mower adjacent to starter 19, and, when the engine is running, be forced down under compression over the engine and into the blade housing 1 to create a pressure as to enable the mower to be lifted off any supporting surface to enable air to escape under the rim portion 9 of the blade housing 1. Also, in both embodiments the exhaust stack 13 discharges hot gases directly from the engine into the blade housing 1 or adjacent thereto.

A feature of both embodiments is that when the engine has reached operating temperature the heat absorbed by the air in cooling the engine and mixing with the exhaust gases from the engine gives rise to an expansion of the air and thus an increase in pressure available to lift the mower from the supporting surface.

Referring now, specifically to FIG. 1 the carburetor 14 of the engine has an air intake 23 which is coupled via a hose 24 with an air cleaner (not shown) on the upper part of the handle of the mower (also not shown). The hose is reinforced or otherwise adapted to prevent it collapsing under suction. This arrangement prevents an excessive intake of dust by the engine.

Referring, now, to FIG. 2 the carburetor 14 has an air intake in the form of an air cleaner 25 which is disposed in the mower body and is subjected to the high air pressure in the body when the engine is running. As the pressure of air entering the carburetor is greater than that in the other embodiment the engine's power is substantially increased, with correspondingly greater cutting efficiency.

In both embodiments, therefore, the air used for cooling the engine is mixed with the exhaust gases to give increased efficiency and economy to the mower which is operated in known manner to cut lawns with a minimum of effort on the part of the operator. Furthermore, in the embodiment of FIG. 2, the engine is given increased power by the expedient of taking its inlet air from the high pressure air passed over the engine.

From the above it will be appreciated that energy which has heretofore been expelled to waste in known types of mowers is used to give increased efficiency.

What I claim as new and desire to secure by Letters Patent is:

1. A lawn mower, comprising:
 (a) a lightweight housing;
 (b) a cylindrical depending skirt on a lower portion of the housing;
 (c) an internal combustion engine mounted within said housing;
 (d) a substantially vertical power shaft projecting on either side of the engine;
 (e) a rotatable cutting blade mounted to said shaft below said engine;
 (f) an air inlet opening into said housing in an upper portion thereof; and
 (g) blower means mounted to said shaft above said engine within the upper portion of said housing between said air inlet opening and said engine for drawing air in through said inlet opening and forcing it downwardly directly over and around said engine and out through said skirt under the peripheral edge thereof to cool said engine and provide the sole means for lifting said mower to an operative position above the ground, the heat energy absorbed by the air in cooling the engine causing the air to expand and thus increase the lifting effect.

2. A lawn mower according to claim 1 wherein the exhaust from the engine discharges into the air compressed by the blower prior to the discharge thereof.

3. A lawn mower according to claim 1 wherein there is provided an air intake for the internal combustion engine in a part of the mower body subject to the increased pressure created therein.

4. A lawn mower according to claim 1 wherein the means for heating at least part of the air are the cylinder heat-cooling fins of the motor.

5. A lawn mower according to claim 1 wherein said housing and skirt are made of a plastic material.

References Cited

UNITED STATES PATENTS

| | | |
|---|---|---|
| 2,557,598 | 6/1951 | Daggett. |
| 2,444,318 | 6/1948 | Warner. |
| 2,993,462 | 7/1961 | Gough. |
| 3,050,146 | 8/1962 | Crim. |
| 3,186,151 | 6/1965 | Hansom. |
| 3,400,523 | 9/1968 | Klingofstrom et al. |

ROBERT E. PULFREY, Primary Examiner

A. E. KOPECKI, Assistant Examiner